United States Patent
Yamaguchi et al.

(10) Patent No.: US 7,136,923 B2
(45) Date of Patent: Nov. 14, 2006

(54) METHOD OF MANAGING A STORAGE AREA NETWORK

(75) Inventors: Akihiko Yamaguchi, Kawasaki (JP); Tatsundo Aoshima, Yokohama (JP)

(73) Assignee: Hitachi, Ltd. (JP)

(*) Notice: Subject to any disclaimer, the term of this patent is extended or adjusted under 35 U.S.C. 154(b) by 219 days.

(21) Appl. No.: 10/884,247

(22) Filed: Jul. 1, 2004

(65) Prior Publication Data
US 2005/0268152 A1    Dec. 1, 2005

(30) Foreign Application Priority Data
May 12, 2004  (JP) ............................ 2004-141802

(51) Int. Cl.
*G06F 15/16* (2006.01)
(52) U.S. Cl. ........................................ 709/224; 710/15
(58) Field of Classification Search ................ 709/200, 709/223, 230; 710/5, 100, 105
See application file for complete search history.

(56) References Cited

U.S. PATENT DOCUMENTS

| | | | |
|---|---|---|---|
| 5,560,021 A | 9/1996 | Vook et al. | |
| 5,613,191 A | 3/1997 | Hylton et al. | |
| 5,630,204 A | 5/1997 | Hylton et al. | |
| 5,636,220 A | 6/1997 | Vook et al. | |
| 5,742,905 A | 4/1998 | Pepe et al. | |
| 5,743,668 A | 4/1998 | Zimmerman | |
| 5,745,884 A | 4/1998 | Carnegie et al. | |
| 5,802,463 A | 9/1998 | Zuckerman | |
| 5,857,201 A | 1/1999 | Wright, Jr. et al. | |
| 5,956,636 A | 9/1999 | Lipsit | |
| 5,966,451 A | 10/1999 | Utsumi | |
| 6,034,621 A | 3/2000 | Kaufman | |
| 6,115,384 A | 9/2000 | Parzych | |
| 6,128,492 A | 10/2000 | Chung | |
| 6,138,158 A | 10/2000 | Boyle et al. | |
| 6,139,892 A | 10/2000 | Short et al. | |
| 6,195,677 B1 | 2/2001 | Utsumi | |
| 6,219,560 B1 | 4/2001 | Erkkila et al. | |
| 6,278,697 B1 | 8/2001 | Brody et al. | |
| 6,292,747 B1 | 9/2001 | Amro et al. | |
| 6,301,471 B1 | 10/2001 | Dahm et al. | |
| 6,324,165 B1 * | 11/2001 | Fan et al. .................... 370/232 |
| 6,526,060 B1 * | 2/2003 | Hughes et al. ........... 370/395.4 |
| 6,772,270 B1 * | 8/2004 | Kurpanek ................... 710/316 |
| 2001/0022837 A1 | 9/2001 | Vasell et al. | |
| 2004/0148380 A1 * | 7/2004 | Meyer et al. ............... 709/223 |
| 2005/0108444 A1 * | 5/2005 | Flauaus et al. ............... 710/15 |

FOREIGN PATENT DOCUMENTS

JP    2003-092571    3/2003

* cited by examiner

*Primary Examiner*—Zarni Maung
*Assistant Examiner*—Van Kim T. Nguyen
(74) *Attorney, Agent, or Firm*—Townsend and Townsend and Crew LLP

(57) ABSTRACT

A host group which uses a specific port as a data transfer path is retrieved to be detected from data transfer paths of respective hosts, and then such a report of an I/O conflict is generated in which only performance data of the retrieved host group is extracted. As a result, such a condition that I/O loads are concentrated to a specific port employed in an SAN (Storage Area Network) can be easily detected, and such hosts which give the loads can be readily specified.

11 Claims, 18 Drawing Sheets

```
MANAGING SUBJECT
APPARATUS LIST INFORMATION

[Host 1]
Name=Host A
IP=12.34.56.78

[Host 2]
Name=Host B
IP=12.34.56.79

[Host 3]
Name=Host C
IP=12.34.56.80

[Host 4]
Name=Host D
IP=12.34.56.81
   . . .

[Switch1]
Name=Switch A
IP=12.34.56.82
```

FIG. 5

HOST-TO-STORAGE MAPPING TABLE 211

| HOST | VOLUME | HOST PORT ID | STORAGE PORT ID |
|---|---|---|---|
| HOST A | VOLUME A-A | WWN OF PORT H-A | WWN OF PORT S-A |
| HOST A | VOLUME A-C | WWN OF PORT H-A | WWN OF PORT S-C |
| HOST B | VOLUME B-D | WWN OF PORT H-B | WWN OF PORT S-D |
| HOST C | VOLUME C-C | WWN OF PORT H-C | WWN OF PORT S-C |
| HOST D | VOLUME D-B | WWN OF PORT H-D | WWN OF PORT S-B |
| HOST D | VOLUME D-D | WWN OF PORT H-D | WWN OF PORT S-D |

STRUCTURAL EXAMPLE

FIG. 7

HOST PERFORMANCE TABLE 212

| VOLUME | HOST PORT ID | STORAGE PORT ID | IOPS | TRANSFER RATE | DATE/TIME |
|---|---|---|---|---|---|
| VOLUME A-A | WWN OF PORT H-A | WWN OF PORT S-A | 1000 | 40MB/s | h_time1 |
| VOLUME A-C | WWN OF PORT H-A | WWN OF PORT S-C | 500 | 25MB/s | h_time1 |
| VOLUME B-D | WWN OF PORT H-B | WWN OF PORT S-D | 600 | 25MB/s | h_time1 |
| VOLUME C-C | WWN OF PORT H-C | WWN OF PORT S-C | 400 | 25MB/s | h_time1 |
| VOLUME D-B | WWN OF PORT H-D | WWN OF PORT S-B | 900 | 40MB/s | h_time1 |
| VOLUME D-D | WWN OF PORT H-D | WWN OF PORT S-D | 900 | 25MB/s | h_time1 |
| ~OMITTED~ | | | | | |
| VOLUME A-A | WWN OF PORT H-A | WWN OF PORT S-A | 1000 | 30MB/s | h_time2 |
| VOLUME A-C | WWN OF PORT H-A | WWN OF PORT S-C | 500 | 20MB/s | h_time2 |
| VOLUME B-D | WWN OF PORT H-B | WWN OF PORT S-D | 600 | 29MB/s | h_time2 |
| VOLUME C-C | WWN OF PORT H-C | WWN OF PORT S-C | 400 | 25MB/s | h_time2 |
| VOLUME D-B | WWN OF PORT H-D | WWN OF PORT S-B | 900 | 0MB/s | h_time2 |
| VOLUME D-D | WWN OF PORT H-D | WWN OF PORT S-D | 900 | 25MB/s | h_time2 |

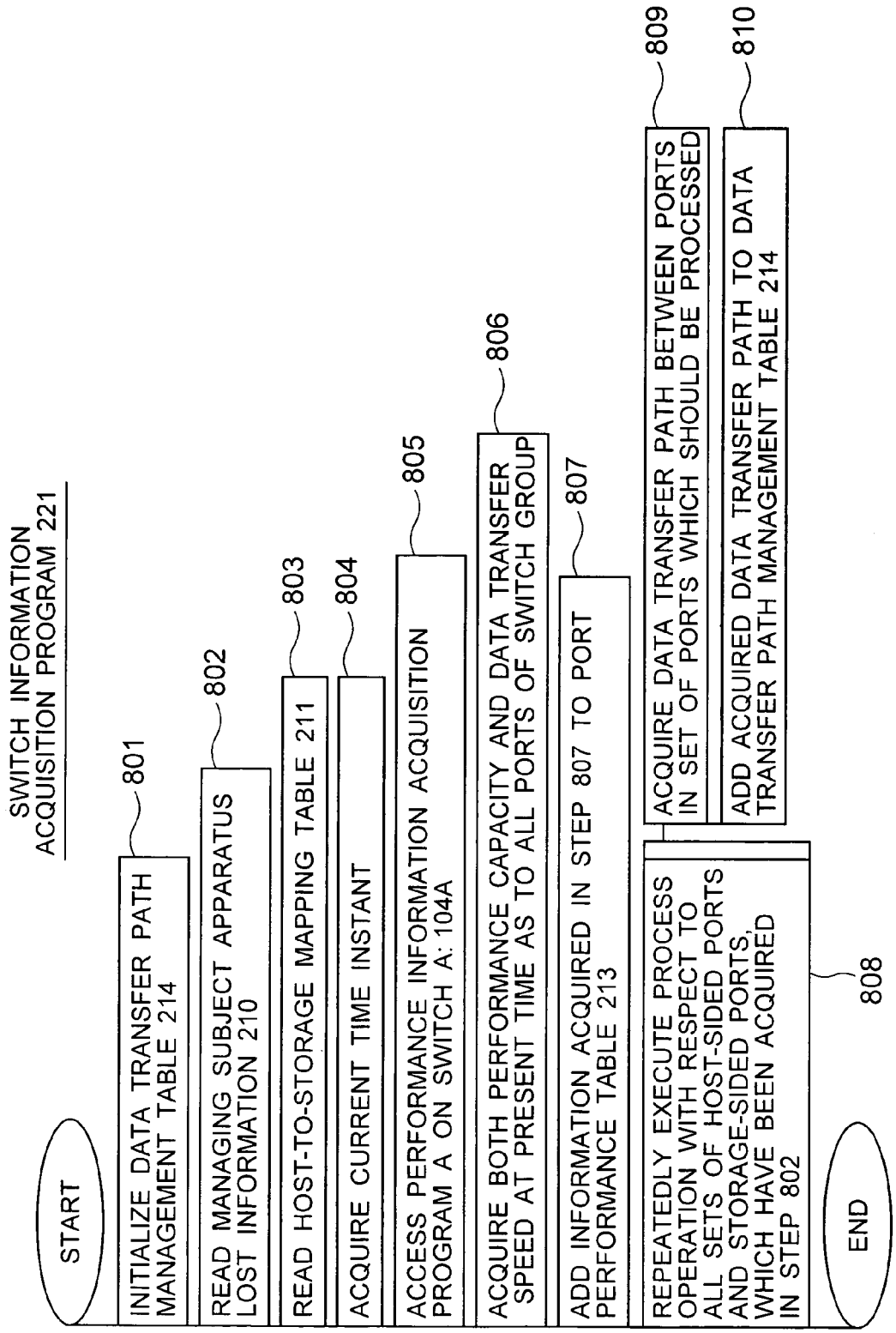

FIG. 9

PORT PERFORMANCE TABLE 213

| PORT ID | TIME | MAX RATE | PRESENT TRANSFER RATE |
|---|---|---|---|
| WWN OF PORT A1 | p_time1 | 200MB/s | 65MB/s |
| WWN OF PORT A2 | p_time1 | 200MB/s | 25MB/s |
| WWN OF PORT A3 | p_time1 | 200MB/s | 90MB/s |
| WWN OF PORT A4 | p_time1 | 200MB/s | 80MB/s |
| WWN OF PORT B1 | p_time1 | 200MB/s | 25MB/s |
| WWN OF PORT B2 | p_time1 | 200MB/s | 65MB/s |
| WWN OF PORT B3 | p_time1 | 200MB/s | 90MB/s |
| WWN OF PORT B4 | p_time1 | 200MB/s | 100MB/s |
| WWN OF PORT C1 | p_time1 | 100MB/s | 80MB/s |
| WWN OF PORT C2 | p_time1 | 100MB/s | 40MB/s |
| WWN OF PORT C3 | p_time1 | 100MB/s | 40MB/s |
| WWN OF PORT D1 | p_time1 | 100MB/s | 100MB/s |
| WWN OF PORT D2 | p_time1 | 100MB/s | 50MB/s |
| WWN OF PORT D3 | p_time1 | 100MB/s | 50MB/s |
| ~OMITTED~ | | | |
| WWN OF PORT A2 | p_time2 | 200MB/s | 29MB/s |
| ~OMITTED~ | | | |
| WWN OF PORT D1 | p_time2 | 100MB/s | 99MB/s |
| ~OMITTED~ | | | |

FIG.10

DATA TRANSFER PATH MANAGEMENT TABLE 214

| HOST | VOLUME | PORT ID 1 | PORT ID 2 |
|---|---|---|---|
| HOST A | VOLUME A-A | WWN OF PORT H-A | WWN OF PORT A1 |
| HOST A | VOLUME A-A | WWN OF PORT A1 | WWN OF PORT A4 |
| HOST A | VOLUME A-A | WWN OF PORT A4 | WWN OF PORT C1 |
| HOST A | VOLUME A-A | WWN OF PORT C1 | WWN OF PORT C2 |
| HOST A | VOLUME A-A | WWN OF PORT C2 | WWN OF PORT S-A |
| HOST A | VOLUME A-C | WWN OF PORT H-A | WWN OF PORT A1 |
| HOST A | VOLUME A-C | WWN OF PORT A1 | WWN OF PORT A3 |
| HOST A | VOLUME A-C | WWN OF PORT A3 | WWN OF PORT B3 |
| HOST A | VOLUME A-C | WWN OF PORT B3 | WWN OF PORT B4 |
| HOST A | VOLUME A-C | WWN OF PORT B4 | WWN OF PORT D1 |
| HOST A | VOLUME A-C | WWN OF PORT D1 | WWN OF PORT D2 |
| HOST A | VOLUME A-C | | WWN OF PORT S-C |
| ~OMITTED~ | | | |
| HOST B | VOLUME B-D | WWN OF PORT B4 | WWN OF PORT D1 |
| ~OMITTED~ | | | |
| HOST C | VOLUME C-C | WWN OF PORT B4 | WWN OF PORT D1 |
| ~OMITTED~ | | | |
| HOST D | VOLUME D-D | WWN OF PORT B4 | WWN OF PORT D1 |
| ~OMITTED~ | | | |

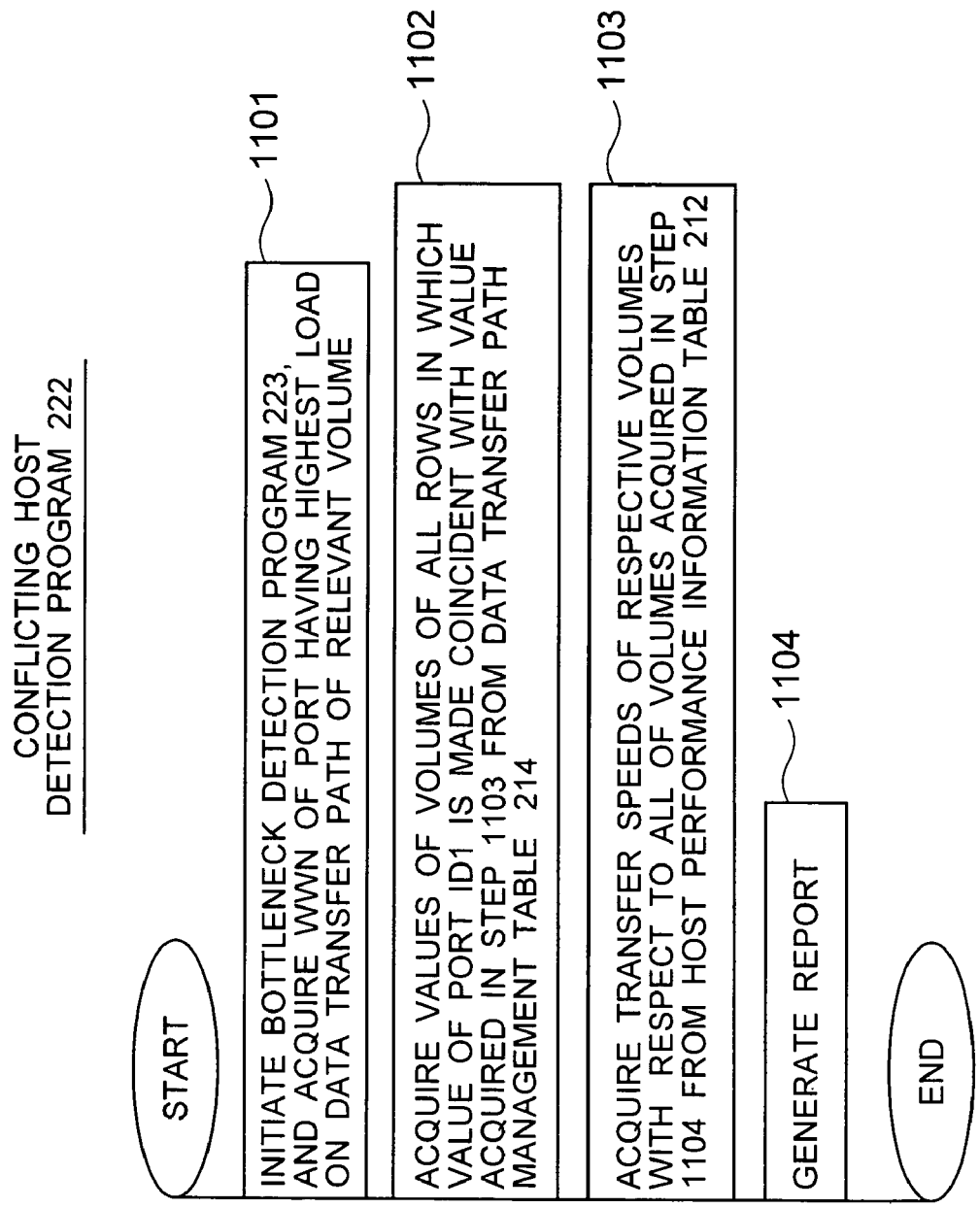

EXAMPLE OF REPORT WHICH IS GENERATED BY
CONFLICTING HOST DETECTION CONTROL PROGRAM 222

FIG. 15

EXAMPLE OF SCSI INQUIRY
INFORMATION WITH VOLUME A-A

| WWN OF CONNECTION SOURCE | ... | WWN OF CONNECTION DESTINATION | ... |
|---|---|---|---|
| WWN OF PORT H-A | ... | WWN OF PORT A1 | ... |
| ... | | | |
| ... | | | |

EXAMPLE 1 OF REPORT WHICH IS GENERATED BY COMPETITIVE HOST DETECTION CONTROL PROGRAM 222

EXAMPLE 2 OF REPORT WHICH IS CONFLICTED BY
COMPETITIVE HOST DETECTION CONTROL PROGRAM 222

METHOD OF MANAGING A STORAGE AREA NETWORK

INCORPORATION BY REFERENCE

The present application claims priority from Japanese application JP2004-141802 filed on May 12, 2004, the content of which is hereby incorporated by reference into this application.

BACKGROUND OF THE INVENTION

The present invention is related to a managing system of an SAN (storage Area Network, will be referred to as "SAN" hereinafter). More specifically, the present invention is directed to such a technique suitably applied to a performance information display/analysis system in the SAN.

Very recently, storage capacities which are required in enterprises are increased in an acceleration manner, and thus, scales of SANs which are conducted to these enterprises are rapidly increased. Since SANs are conducted, operation business such as backup operations and failure management can be localized, and operation management cost can be reduced. Generally speaking, however, since scales of SANs are increased, performance management practically becomes difficult. For instance, in such a case that a large number of hosts are connected to an SAN, loads are concentrated to a specific port provided within the SAN, which may cause a bottleneck. Thus, there are some possibilities that I/O performance of the hosts cannot be established.

The SAN managing system described in JP-A-2003-92571 can discover malfunction of a network appliance and a performance deterioration of a network appliance in an earlier stage by co-operating a monitoring function of a network appliance with a monitoring function of network performance.

In such an arrangement that a large number of hosts are connected to an SAN, I/O process operations from the plural hosts are concentrated to a specific port provided in the SAN. As a result, there are some possibilities that I/O performance deteriorations of the hosts may be induced. An I/O amount processed by a specific port employed in an SAN can be viewed/analyzed by a tool which is provided by an FC switch apparatus. However, in accordance with this method, it is practically difficult to specify a reason as to the I/O conflict performance problem which is conducted by setting an FC switch apparatus on the outer side. In other words, concretely speaking, this method can hardly specify such a host group which gives an I/O load to the specific port provided in the SAN.

SUMMARY OF THE INVENTION

An object of the present invention is to provide a method capable of easily specifying such a host group which induces the conflict of I/O at a port provided in an SAN (Storage Area Network), while the above-explained problem can be solved.

The present invention is to provide a method for displaying at once performance index values of a host group by setting a specific port employed in an SAN as a starting point, while this host group gives a load to this specific port. Concretely speaking, an SAN managing system which has performed the present invention acquires data transfer path information of respective hosts connected to the SAN, performance information of the host group, and performance information of the ports employed in the SAN. When an instruction is issued from a user, this performance managing tool retrieves to detect such a host group which uses a specific port as a data transfer path from data transfer path information of the respective hosts, and then, generates a report of the I/O conflict, in which only performance data of this detected host group is extracted.

BRIEF DESCRIPTION OF THE DRAWINGS

FIG. 4 is a diagram for representing a concrete example of a managing subject apparatus list 210 employed in the first embodiment of the present invention.

FIG. 5 is a diagram for showing concrete example of a host storage mapping table 211 employed in the first embodiment of the present invention.

FIG. 7 is a diagram for representing a concrete example of a host performance table 212 in the first embodiment of the present invention.

FIG. 8 is a PAD for showing a process sequential operation of a switch information acquisition program 221 executed in the first embodiment of the present invention.

FIG. 9 is a diagram for indicating a concrete example of a port performance table 213 employed in the first embodiment of the present invention.

FIG. 10 is a diagram for denoting a concrete example of a data transfer path table 214 employed in the first embodiment of the present invention.

FIG. 11 is a PAD for indicating a process sequential operation of a conflicting host detecting program A 222 employed in the first embodiment of the present invention.

FIG. 15 is a diagram for representing an example of SCSI inquiry information used in the first embodiment of the present invention.

DETAILED DESCRIPTION OF THE EMBODIMENTS

Referring now to drawings, a description is made of a storage system according to a first embodiment of the present invention.

Figure 1:
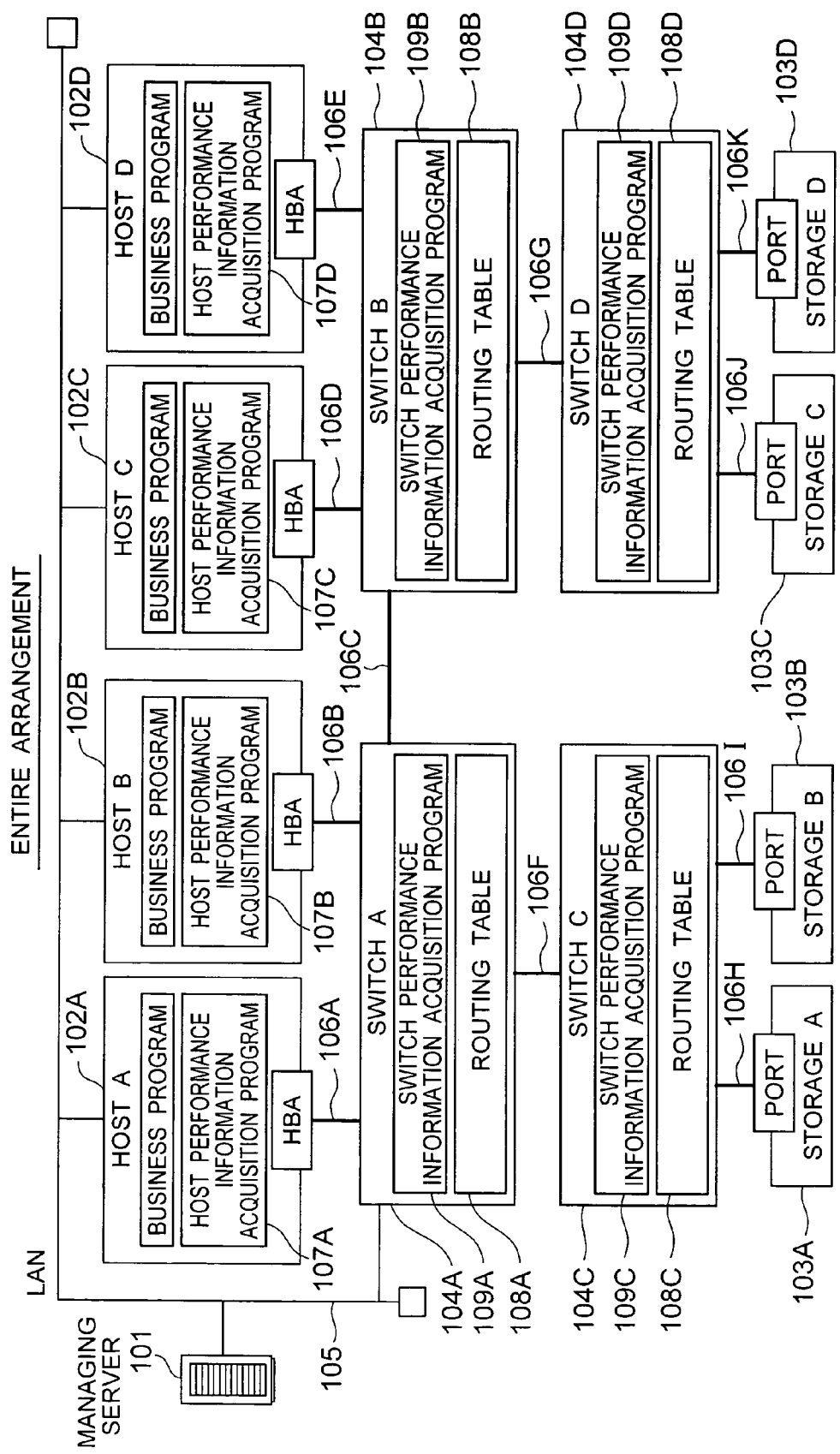
FIG. 1 is a block diagram for schematically showing an entire arrangement of a storage system according to a first embodiment of the present invention.

FIG. 1 is a diagram for schematically showing an entire arrangement of the storage system of this first embodiment. The storage system is arranged by a host group (102A–102D), a storage apparatus group (103A–103D), a switch group 104A–14D), and a LAN 105. The host group is constructed of a managing server 101, a host A (102A), a host B (102B), a host C (102C), and a host D (102D). The storage apparatus group is constructed of a storage A (103A), a storage B (103B), a storage C (103C), and a storage D (103D). The switch group is constituted by a switch A (104A), a switch B (104B), a switch C (104C), and a switch D (104D). The LAN 105 connects the managing server 101, the host group, and the switch A with each other.

The host group is connected via the switch group to the storage apparatus group respectively. In this case, a connection terminal between the respective apparatus will be referred to as a "port" (602A–602D, 603A–603D, 604A1–604A4, 604B1–604B4, 604C1–604C4, 604D1–604D4), whereas a transfer path of data between the respective apparatus, namely a connection between ports will be referred to as a "link." In FIG. 1, there are a link A (corresponds to 106A), a link B (corresponds to 106B), a link C (corresponds to 106C), - - - , a link K (corresponds to 106K).

In order to avoid cumbersome explanations and cumbersome drawings, the host group, the storage group, and the switch group are arranged by 4 sets of the relevant units respectively in FIG. 1. Alternatively, other numbers of relevant units may be employed so as to construct each of these groups. Also, a total number of ports of each apparatus may be alternatively selected.

The managing server 101 acquires respective performance information from the host group and the switch group via the LAN 105, and then manages the acquired performance information. Also, the managing server 101 owns such a function that in response to timing of a request and the like issued from a user, the managing server 101 detects a bottleneck on a data transfer path between a designated host and a volume present in the storage apparatus group, and generates a performance report of hosts containing another host which uses the path for constituting the bottleneck. In this first embodiment, the timing of the above-described process operation is defined by the user request. However, there is no specific restriction as to timing of an execution of a process operation. For instance, a detection of a performance deterioration of a host, a request of an execution every predetermined time interval defined by a timer, and the like may be alternatively employed as this timing. Also, this first embodiment has described that an execution result of a process operation is indicated on a display. Alternatively, the execution result may be generated as an image and/or a document, and the image and/or the document may be notified to a manager in the form of an electronic mail and/or a print output of a printer.

Each host of the host group is connected to any one of these switches, and then is connected via the connected switch to the switch group and the storage apparatus group. Each of the hosts executes a business program for executing a business process operation using data which have been stored in the storage apparatus group, and a host performance information acquisition program for acquiring I/O performance information of a host.

Each storage apparatus of the storage apparatus group is connected to any of the switches, and then is connected via the connected switch to the switch group and the host group.

Each switch of the switch group is connected to the host group, the storage apparatus, and another switch of the switch group. The switch group relays data transferred between the host group and the storage apparatus group. Each switch of the switch group executes a switch performance information acquisition program (109A–109D) for acquiring switch performance information of the own switch.

As to standards of the T11 committee of ANSI (American National Standards Institute), an API standard for managing FC switches called as FC-SWAPI (Fibre Channel Switch API) is provided. In the FC-SWAPI, the API standard has been opened which is employed so as to acquire performance information, structural information (connection information among switches, specification information as to each switch, etc.), transfer path information as to data, and the like from an FC switch. Although various vendors have developed FC switches, if an FC switch is constructed in conformity to the FC-SWAPI, then information of the FC switch can be acquired by a method made in accordance with the FC-SWAPI standard due to this API standard. This first embodiment will explain such an example that the managing server 101 performs an information acquiring operation of a switch in accordance with the method made in conformity to the FC-SWAPI. Since an internal process operation of a switch performance information acquisition program for acquiring performance information on each of the switches does not depend upon this method, an explanation as to the switch performance information acquisition program for acquiring the performance information on the respective switches is omitted.

The FC-SWAPI discloses a method (will be referred to as "proximity mode access" hereinafter), and another method (will be referred to as "target mode access" hereinafter). In the proximity mode access method, information about all of switches employed in an SAN can be acquired by merely accessing one switch (otherwise, server which manages all switches within SAN) employed in the SAN. In the target mode access method, the respective switches employed in the SAN are accessed so as to acquire information as to the respective switches. This first embodiment employs such an arrangement that the switch A acquires information containing other switches of the switch group, and then provides performance information of the switch group via the LAN 105 to the managing server 101, namely such an arrangement that supposing an information acquisition in the proximity access mode, only the switch A employed in the switch group is connected to the LAN 105. However, if the managing server 101 can acquire performance information and structural information of a switch, and also, transfer path information of data, then this acquisition of these information by the managing server 101 may be satisfied. Thus, it is also possible that the managing server 101 may alternatively acquire information in the target mode access method. It should be noted that in this alternative case, such an arrangement is required that all of the switches of the switch group are connected to the LAN 105. Similarly, the managing server 101 may alternatively execute an information acquiring operation as to a server which manages all of the switches employed in the SAN in the proximity mode access method. Note that, in this case, such an arrangement is required in which the server for managing all of the switches employed in the SAN is connected to the LAN 105. Alternatively, if the managing server 101 according to the present invention can acquire the performance information and structural information of the switches and also the transfer path information of the data, then there is no problem that the access method to the switches does not correspond to FC-SWAPI. For example, in the case of such a switch (104A–104D) which provides performance information and structural information of the switch and also transfer path information (108A–108D) of data based upon a technical specification specific to a vendor, the managing server 101 acquires the information of the switch in accordance with the technical specification specific to this vendor.

Figure 2:
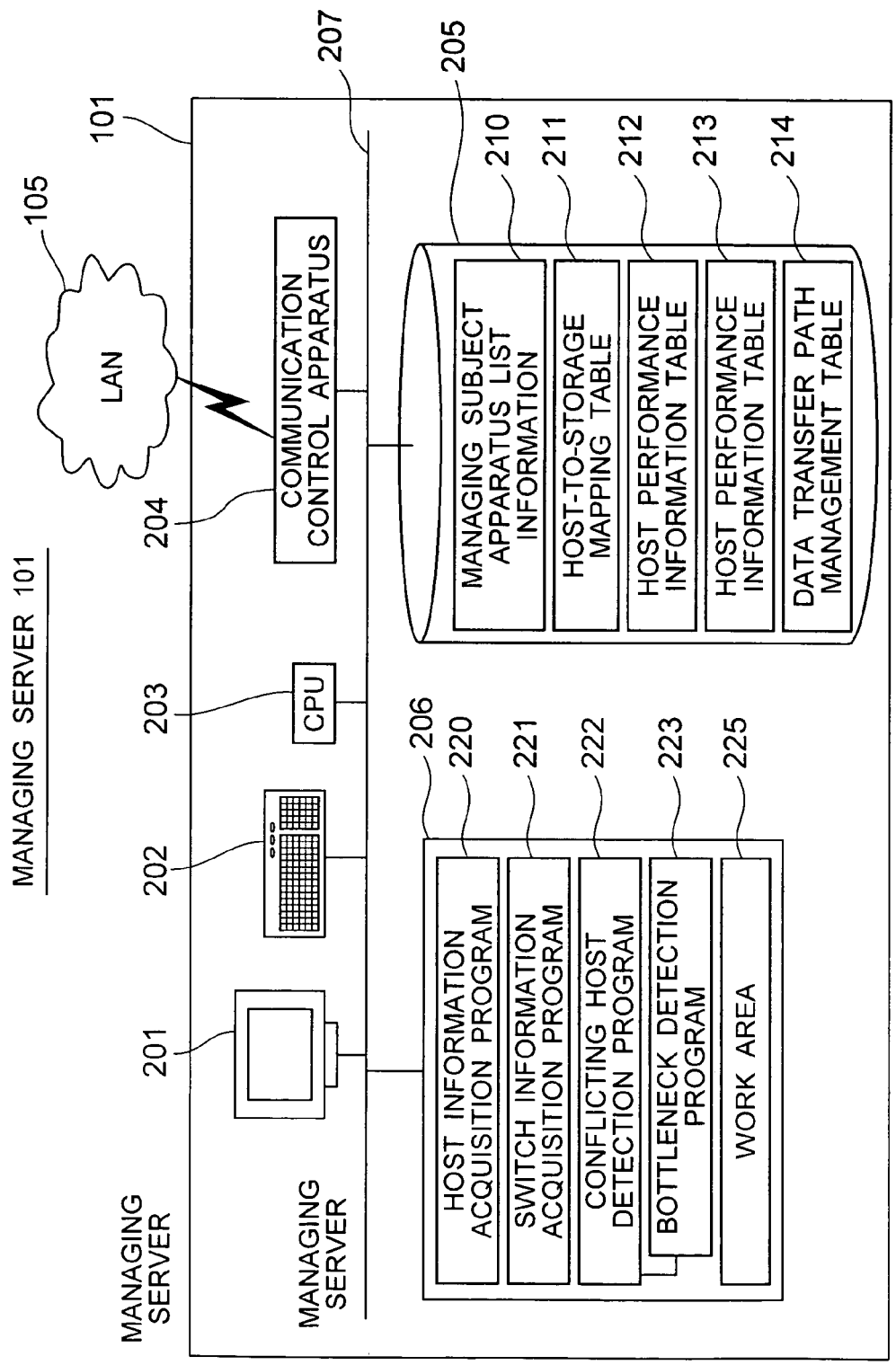
FIG. 2 is a block diagram for schematically indicating an arrangement of a managing server 101 employed in the first embodiment of the present invention.

FIG. 2 is a diagram for indicating an internal arrangement of the managing server 101 in this first embodiment. The managing server 101 is arranged by a display 201, an instruction input apparatus 202, a central processing unit (CPU) 203, a communication control apparatus 204, an external storage apparatus 205, a memory 206, and also a bus 207 which connects these units to each other.

The display 201 displays an execution status, an execution result and the others of a processing of the managing server 101. The instruction input apparatus 202 corresponds to such an apparatus as a keyboard and a mouse for inputting an instruction to a computer, and enters an instruction such as an initiation of a program. The central processing unit 203 executes various sorts of programs stored in the memory 206. The communication control apparatus 204 transits/receives various sorts of data and various commands via the LAN 105 with respect to other apparatus. The external storage apparatus 205 stores thereinto various sorts of data which are used to execute a process operation by the managing server 101. The memory 206 stores thereinto various sorts of programs used to execute a process operation by the managing server 101, and temporal data.

A managing subject apparatus list 210, a host-to-storage mapping table 211, a host performance table 212, a port performance table 213, and a data transfer path table 214 are stored in the external storage apparatus 205. The above-explained information is utilized by the various sorts of programs which are executed by the managing server 101.

A host information acquisition program 220, a switch information acquisition program 221, a conflicting host detection program 222, and a bottleneck detection program 223 are stored in the memory 206, and a work area 225 is held in this memory 206 the work area 225 is used in order to store thereinto temporal data which is required when a program is executed.

The host information acquisition program 220 acquires performance information as to such a host shown in the managing subject apparatus list 210 and stores the acquired performance information to the host performance table 212, and further, stores a correspondence relationship between a port of a host and a port of a storage to which data is transferred from this port into a host-to-storage mapping table 211.

The switch information acquisition program 221 acquires performance information of respective ports of the switch group from such a switch indicated in the managing subject apparatus list 210, and then stores the acquired performance information into the port performance table 213. Furthermore, the switch information acquisition program 221 acquires data transfer path information from the relevant switch, and then stores the acquired data transfer path information into the data transfer path table 214. This data transfer path information has been stored in the host-to-storage mapping table 211, and indicates a correspondence relationship between a port of a host side and a port of a storage side.

While the conflicting host detection program 222 owns the bottleneck detection program 223 as a sub-program, this conflicting host detecting program 222 is initiated in response to a request issued from a user, and the like. When the conflicting host detection program 222 is initiated, this detection program 222 detects such a port which constitutes a bottleneck by utilizing the bottleneck detection program 223. The conflicting host detection program 222 detects such a host (host group) which uses the detected port from the data transfer path table 214, and then, generates a report of the I/O conflict which contains performance data of this host (host group).

The bottleneck detection program 223 specifies such a port which constitutes a bottleneck by employing the port performance table 213 and the data transfer path table 214, and notifies this specified result to the conflicting host detection program 222.

Figure 6:
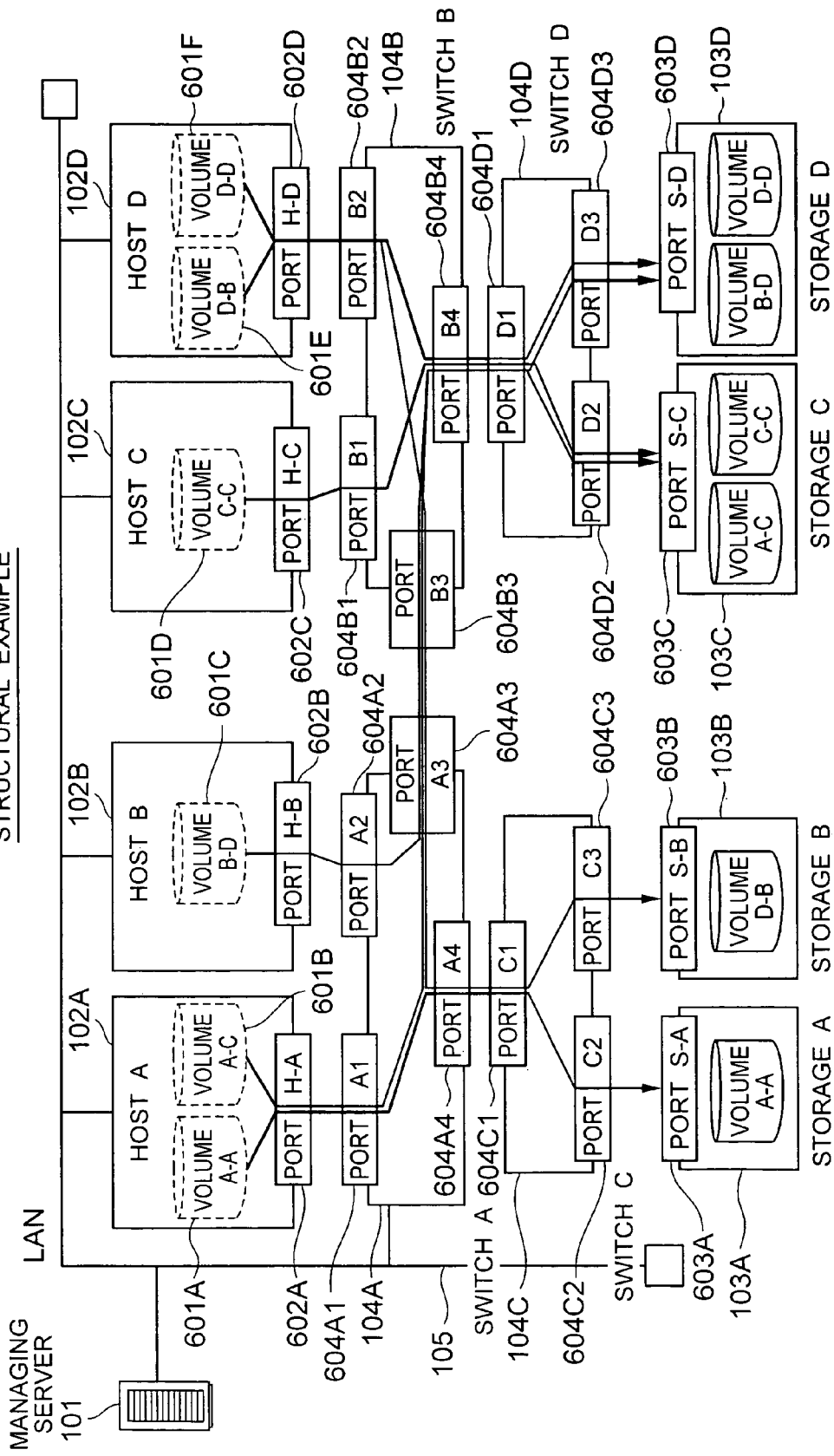
FIG. 6 is a block diagram for schematically indicating a concrete entire structural example according to the first embodiment of the present invention.

Next, a description is made of a process operation of the managing server 101 in this first embodiment with employment of FIG. 6.

In this example, the host A uses both a volume A-A (601A) on the storage A and a volume A-C (601B) on the storage C. The host B uses a volume B-D ( )601C on the storage D. The host C uses a volume C-C (601D) on the storage C. The host D uses both a volume D-B (601E) on the storage B and a volume D-D (601F) on the storage D. In this example, such a condition is represented. That is, in particular, I/O is concentrated to both a port B4 (604B4) of the switch B and a port D1 of the switch D (604D1), and a load is given thereto. In other words, this drawing indicates such a status that the I/O is concentrated to a link G.

Figure 3:
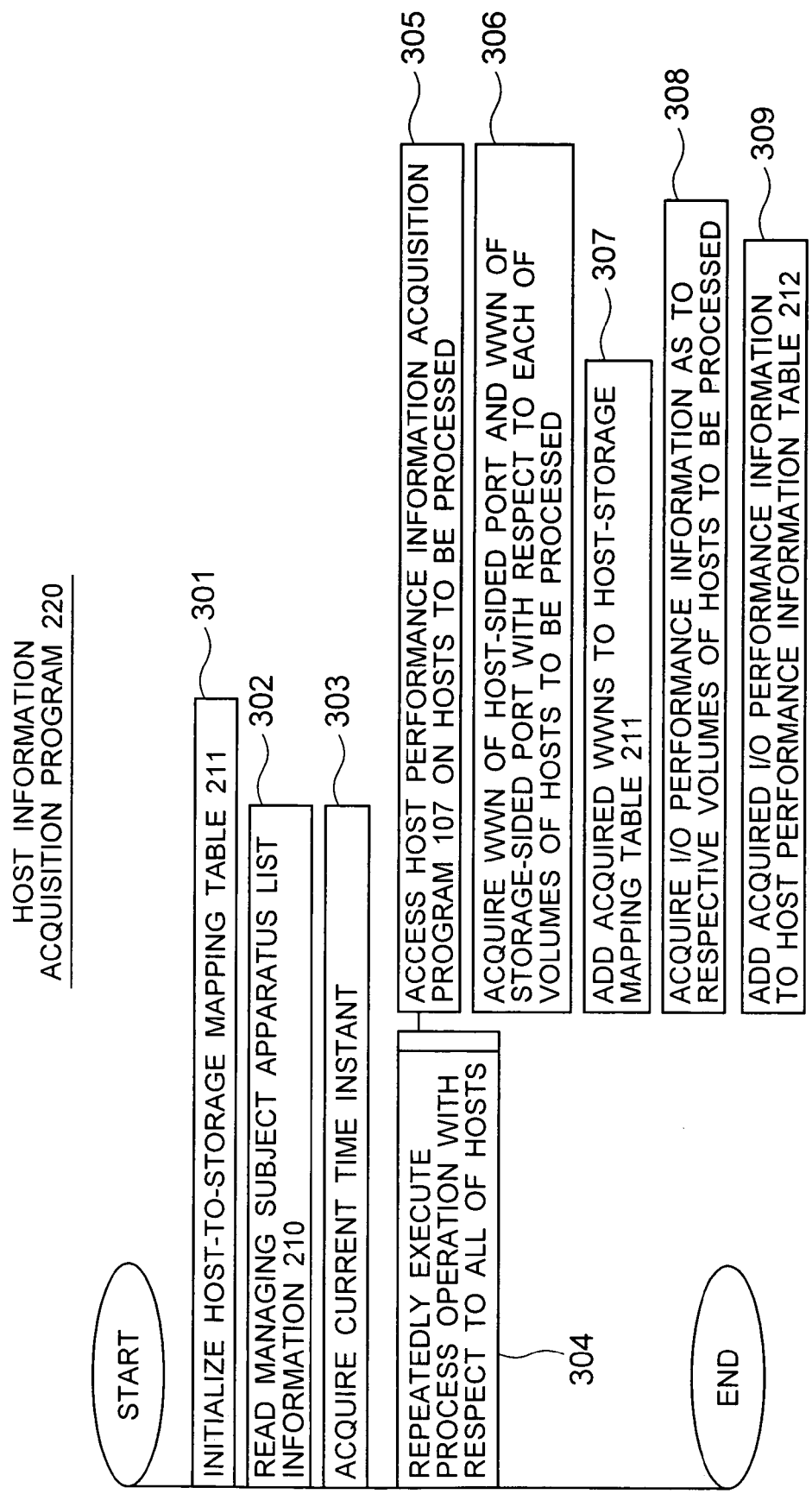
FIG. 3 is a PAD (problem Analysis Diagram) for indicating a process sequential operation of a host information acquisition program 220 executed in the first embodiment of the present invention.

FIG. 3 is a PAD (Problem Analysis Diagram) for indicating a process operation of the host information acquisition program 220 in this first embodiment.

When the host information acquisition program 220 is initiated in response to a program initiation command issued from the instruction input apparatus 202, or an initiation command issued by a timer in a periodic manner, this host information acquisition program 220 initializes (namely, clears information) the host-to-storage mapping table 211 (step 301).

In a step 302, the host information program 220 reads the managing subject apparatus list 210 from the external storage apparatus 205, and acquires information of a host group which is to be managed such as an IP address. In FIG. 4, there is shown an example of the managing subject apparatus list 210. In this embodiment, the managing subject apparatus list 210 has stored thereinto both information of a host (host group) and a switch (switch group). The information of the host (host group) is used by the host information acquisition program 220, whereas the information of the switch (switch group) is used by the witch information acquisition program 221. For the sake of an easy understanding, in the example of FIG. 4, information such as host names is indicated in addition to the IP address. However, the managing subject apparatus list 210 may merely represent only such information as an IP address which is required so as to access via the LAN 105 to the respective apparatus. Also, the managing subject apparatus list 210 may be alternatively generated in a manual manner, or may be automatically generated in such a way that another program scans either a host group or a switch, which are connected to the LAN 105. In this embodiment, such an arrangement is employed in which the information of the host group which is managed and the information of the switch (switch A) connected to the LAN 105 are stored in the managing subject apparatus list 210. Alternatively, another arrangement may be employed, namely, information of a host and information of a switch may be separately managed as separate information.

In a step 303, a current time instant is acquired.

In a step 304, the host information acquisition program 220 is entered to a loop in which a process operation defined from a step 305 to a step 309 is repeatedly carried out with respect to the respective hosts from which the information has been acquired in the above-explained step 302.

In the step 305, the host information acquisition program 220 accesses a host performance information acquisition program on a host to be processed. This first embodiment has explained such a case that while the host information acquisition program 220 grasps in advance the TCP port number which is waited to be received by the host performance information acquisition program, the host information acquisition program 220 can access the host performance information acquisition program by using only the information of the IP address. However, another access method may be employed. That is, while the TCP port number which is waited to be received by the host performance information acquisition program has been stored in the managing subject apparatus list 210, the host information acquisition program 220 may alternatively access the TCP port number indicated in the managing subject apparatus list 210.

In a step 306, a pair of a WWN (World Wide Name) of a storage-sided port and a WWN of a host-sided port is acquired from the host performance information acquisition program 107. The WWN of the storage-sided port is being used by a host as to a volume of the storage. The WWN of the host-sided port is used to transfer data to this port of the storage side. For instance, as explained in the example shown in FIG. 6, in such a case that the host A uses both the volume A-A of the storage A and the volume A-C of the storage C, in this step 306, both a pair of a WWN of a port H-A (602A) and a WWN of a port S-A (603A), and also, another pair of the WWN of the port H-A and a WWN of a port S-C (603C) are acquired from the host performance information acquisition program 107A.

In a step 307, the pair of the WWN of the host-sided port and the WWN of the storage-sided port, which has been acquired in the step 306, is added to the host-to-storage mapping table 211. FIG. 5 indicates an example of the host-to-storage mapping table 211 employed in the example indicated in FIG. 6. In FIG. 5, host names have been stored in a column of hosts; volume names have been stored in column of volumes; WWNs of host-sided ports have been stored in a column of host port IDs; and also, WWNs of storage-sided ports have been stored in a column of storage port IDs. Alternatively, other information may be alternatively employed to replace the above-described information, if a correspondence relationship between hosts and volumes which are used by these hosts can be specified, for instance, IP addresses of host may be stored instead of the host names; devise file names of relevant volumes may be stored instead of the volume names; and also, IDs of ports (3-bytes ID which is automatically allocated to each port within SAN) may be stored instead of the WWNs of the ports.

In a step 308, I/O performance information is acquired from the host performance information acquisition program 107 as to a volume of a storage, which is being used by the relevant host.

In a step 309, both the time instant information acquired in the step 303 and the I/O performance information of the volume of the storage, which has been acquired in the step 308, are added to the host performance table 212.

An example of the host performance table 212 in the example shown in FIG. 6 is represented in FIG. 7. In FIG. 7, volume names have been stored in a column of volumes; WWNs of host-sided ports have been stored in a column of host port IDs; WWNs of storage-sided ports have been stored in a column of storage port IDs; time instant information which was acquired in the step 303 when information of the relevant line is stored has been stored in a column of date/time; IOPS (IO per Second: IO times per 1 second) in the relevant time instants of the relevant volumes have been stored in a column of IOPSs; and also, transfer byte numbers (B/S) per 1 second in the relevant time instants of the relevant volumes have been stored in a column of transfer rates. However, if the information as to the columns of the volumes, the host port IDs, and the storage port IDs are made coincident with the information of the relevant columns in the host-to-storage mapping table 211, then the column information may be employed. Also, in this example, as representative information by which the performance of the relevant volume can be grasped, both the IOPS and the transfer rates (B/S) are indicated. Alternatively, any one of information may be employed which contains other performance information such as a transfer bit number, a transfer frame number, Read IOPS, and write IOPS. Further, as explained in this example, two sets, or more sets of the information may be alternatively stored.

FIG. 8 is a PAD for indicating a process operation of the switch information acquisition program 221 in this first embodiment.

When the switch information acquisition program 221 is initiated in response to a program initiation command issued from the instruction input apparatus 202, or an initiation command issued by a timer in a periodic manner, this switch information acquisition program 221 initializes (namely, clears information) the data transfer path table 214 (step 801). In a step 802, the switch information program 221 reads the managing subject apparatus list 210 from the external storage apparatus 205, and acquires information such as an IP address of a switch (switch A) which is connected to the LAN 105. In a step 803, the switch information acquisition program 221 reads the host-to-storage mapping table 211 from the external storage apparatus 205, and then, stores a pair of a WWN of a host-sided port and a WWN of a storage-sided port into the work area 225.

In a step 804, a current time instant is acquired.

In a step 805, while employing the acquired IP address of the switch A, the switch information acquisition program 221 accesses a switch performance information acquisition program A on the switch A. It should be understood that this first embodiment has explained such a case that while the switch information acquisition program 221 grasps in advance the TCP port number which is waited to be received by the switch performance information acquisition program A, the switch information acquisition program 221 can access the switch performance information acquisition program A by using only the information of the IP address. However, another access method may be employed. That is, while the TCP port number which is waited to be received by the switch performance information acquisition program A has been stored in the managing subject apparatus list 210, the switch information acquisition program 221 may alternatively access the TCP port number indicated in the managing subject apparatus list 210.

In a step 806, such performance information is acquired from the switch performance information acquisition program A, and this performance information contains both a performance capacity (maximum transfer rate) and a present data transfer rate as to a port of each switch.

In a step 807, both the information as to the current time instant acquired in the step 804 and the performance information of the port of the switch acquired in the step 806 are added to the port performance table 213. FIG. 9 indicates an example of the port performance table 213 used in the example shown in FIG. 6. In this FIG. 6, WWNs of the relevant ports have been stored in a column of port IDs; the time instant information acquired in the step 804 has been stored in a column of time instants; maximum transfer rates of the relevant ports have been stored in a column of MAX rates; and transfer rates of the relevant ports at time instants when information had been acquired, have been stored in a column of present transfer rates.

In a step 808, the switch information acquisition program 221 is entered to such a loop that a process operation defined in a step 809 and a step 810 is repeatedly carried out with respect to a pair of the WWN of the host-sided port and the WWN of the storage-sided port, which have been acquired in the above-explained step 803.

In the step 809, while a designation is made of a pair of the WWN of the host-sided port and the WWN of the storage-sided portion as to the present processing subject, a data transfer path between the relevant ports is acquired from the switch performance information acquisition program.

In the step 810, a data transfer path (will be referred to as "path") between the ports in the pair of the WWN of the host-sided portion and the WWN of the storage-sided portion is added to the data transfer path table 214. FIG. 10 shows an example of the data transfer path table 214 in the example represented in FIG. 6. In FIG. 10, host names have been stored in a column of hosts; and volume names have been stored in a column of volumes. Also, WWNs of ports of the respective links, which are located near the host side, have been stored in a column of port ID1; and WWNs of ports of the respective links, which are located near the storage side, have been stored in a column of port ID2. Each of these links constitute data transfer paths between a host and a storage in the relevant volume.

FIG. 11 is a PAD for indicating a process operation of the conflicting host detection program 222 in this first embodiment.

The conflicting host detection program 222 commences an execution in response to an initiation command for designating a volume issued from the instruction input apparatus 202. The conflicting host detection program 222 executes the below-mentioned process operation which notifies a conflicting condition of a highly loaded port on a data transfer path routed to the designated volume.

In a step 1101, the bottleneck detection program 223 is executed so as to acquire a WWN of such a port having a high load on the data transfer path (path) of the designated volume.

In a step 1102, while the data transfer path table 214 is employed, a data transfer path (path) is detected which contains a WWN of a port, which is made coincident with the acquired WWN, and then, a volume name which employs the detected data transfer path (path) is acquired.

In a step 1103, performance information of such a volume corresponding to the acquired volume name is acquired from the host performance table 212.

Figure 12:
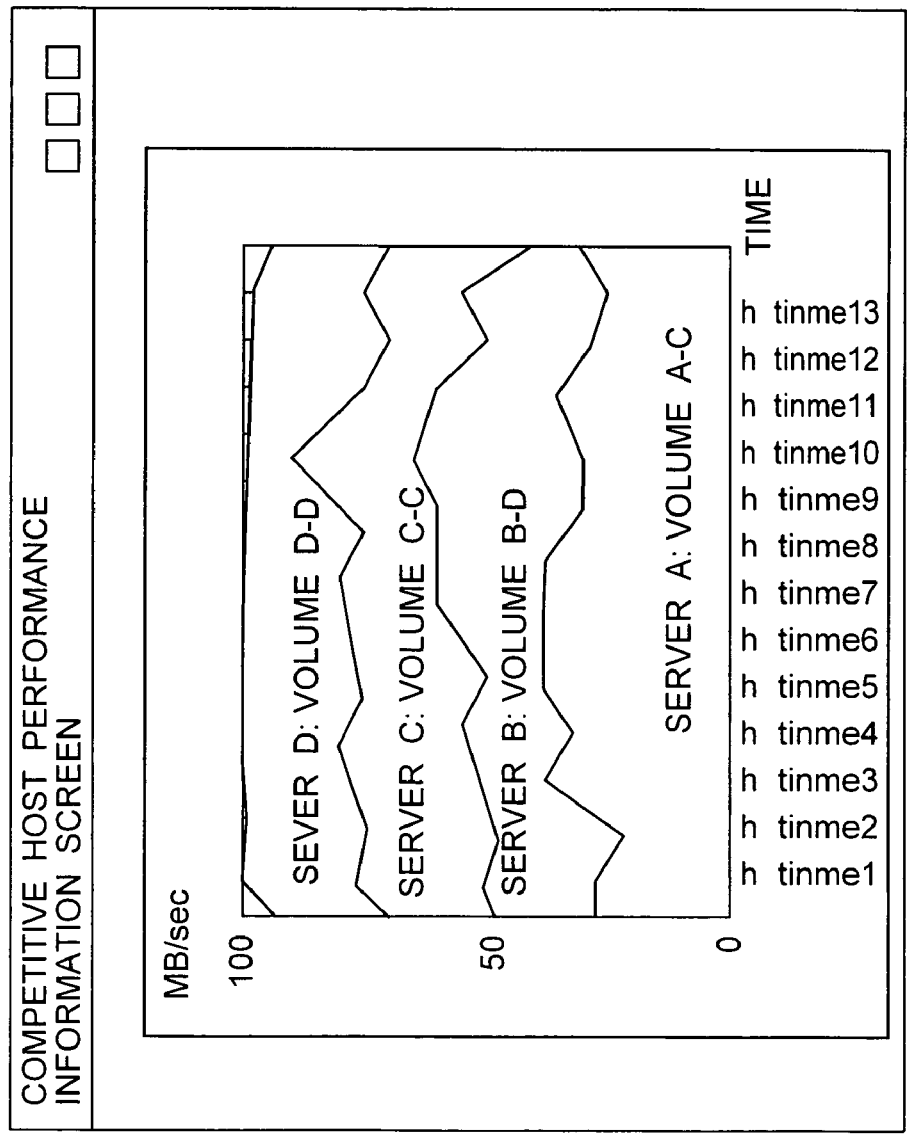
FIG. 12 is a diagram for showing a report example which is generated by the conflicting host detecting program A 222 executed in the first embodiment of the present invention.

In a step 1104, a report is generated based upon the performance information as to the acquired respective volumes. FIG. 12 represents an example a report of the port B4 in the example shown in FIG. 6. The report example of FIG. 12 corresponds to such an example that the performance information as to the acquired respective volumes are represented in a graph. FIG. 12 is the graph made by paying an attention to the port B4. Since this port B4 owns a connecting relationship with a port D1, such a report made by paying an attention to the port D1 may be alternatively viewed. Furthermore, such a report made by paying an attention to a link G connected between the port B4 and the port D1 may be alternatively viewed. The user can specify such a host which increases the I/O load of the relevant port by referring to such a report of FIG. 12.

Figure 13:
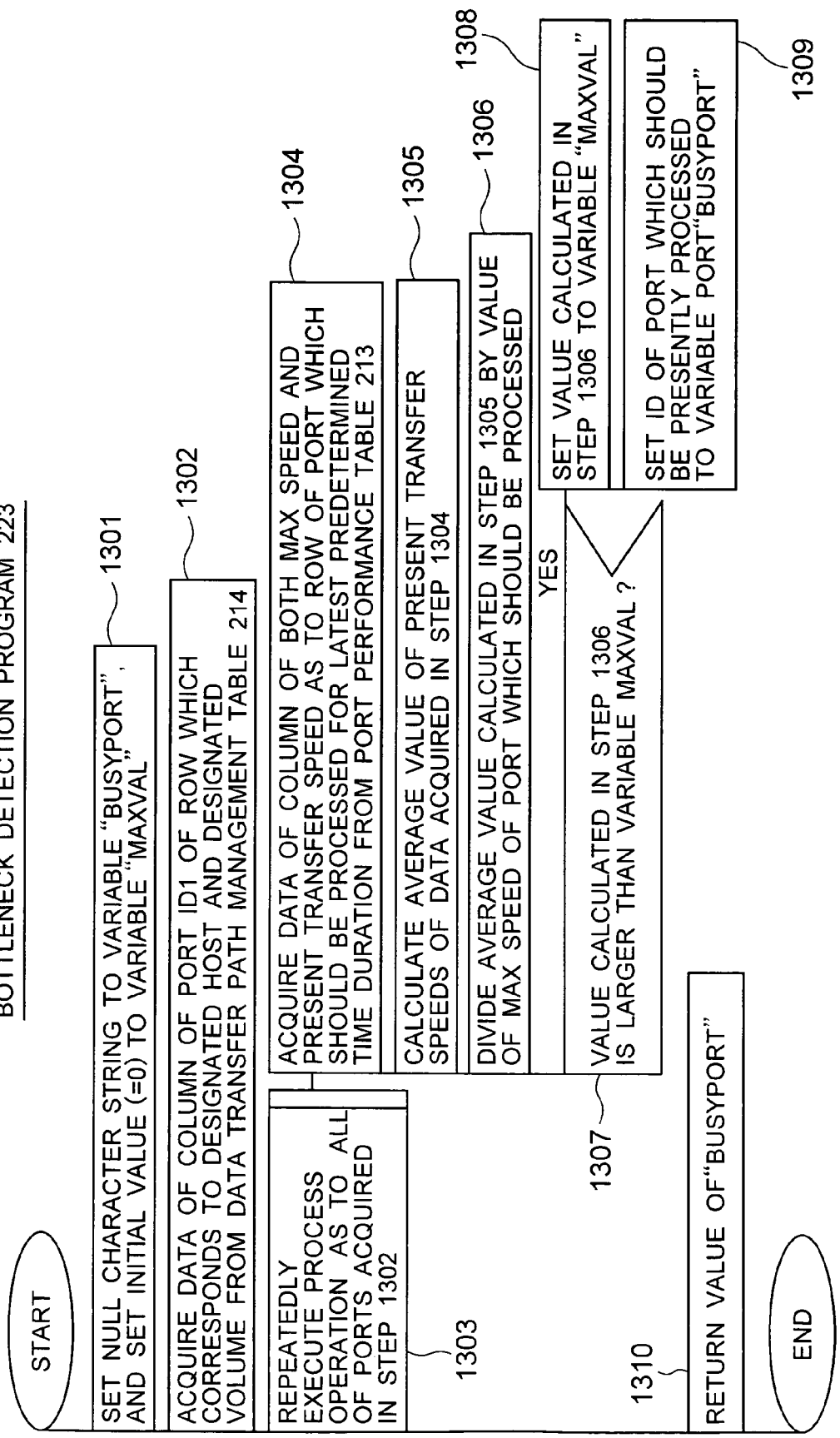
FIG. 13 is a PAD for indicating a process sequential operation of a bottleneck detecting program 223 executed in the first embodiment of the present invention.

FIG. 13 is a PAD for indicating a process operation of the bottleneck detection program 223 in this first embodiment.

When the bottleneck detection program 223 is initiated from the conflicting host detection program 222, a null character string is set to a variable "BusyPort" and "0" is set to a variable "MaxVal" (step 1301). In a step 1302, data of the column of the port ID1 of such a row corresponding to the designated volume is required from the data transfer path table 214, and a port on the data transfer path of the corresponding volume is acquired.

In a step 1303, the bottleneck detection program 223 is entered to such a loop that a process operation defined from a step 1304 to a step 1309 is repeatedly carried out with respect to the acquired port.

In a step 1304, both a MAX rate (namely, transfer rate as maximum performance value defined in technical specification) of a port to be processed, and data of the present transfer rate for a predetermined time duration (for example, 1 hour before latest information) are acquired from the port performance table 213.

In a step 1305, an average value of the present transfer rate as to the acquired data is calculated.

In a step 1306, the calculated average value of the transfer rates is divided by the MAX rate value of the port to be processed.

In a step 1307, the value calculated in the step 1306 is compared with the value of the variable "MaxVal." In such a case that the value calculated in the step 1306 is larger than the variable "MaxVal", the process operation is advanced to a step 1308.

In this step 1308, the value calculated in the step 1306 is set to the variable "MaxVal."

In a step 1309, a WWN of the port to be processed is set to the variable "BusyPort."

In a step 1310, the variable "BusyPort" is returned. In other words, the WWN of the port having the high load on the path to the designated volume is notified to the conflicting host detection program 222.

Figure 14:
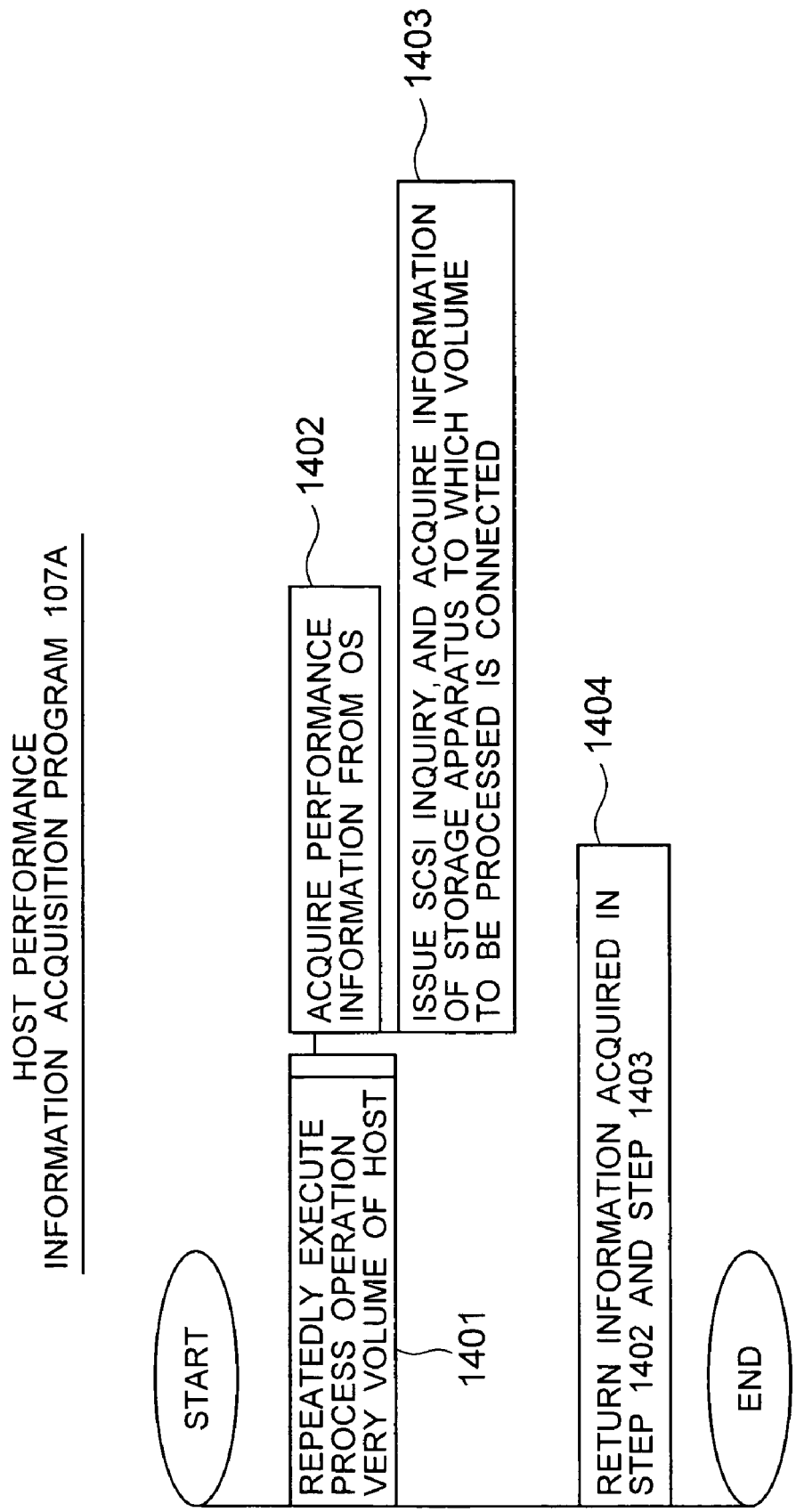
FIG. 14 is a PAD for showing a process sequential operation of a host performance information acquiring program 107A executed in the first embodiment of the present invention.

FIG. 14 is a PAD for representing a process operation of a host performance information acquisition program 107A on the host A in this first embodiment. It should also be understood that with respect to a host performance information acquisition program 107B on the host B, a host performance information acquisition program 107C on the host C, and a host performance information acquisition program 107D on the host D, since process operations thereof are carried out in a similar manner to that of the above-explained host performance information acquisition program 107A, explanations thereof are omitted.

The host performance information acquisition program 107A commences a process operation thereof in response to an information acquisition request issued from the managing server 101.

In a step 1401, as to a volume which is used by the host A, the host performance information acquisition program 107A is entered to such a loop that a process operation defined from a step 1402 to a step 1403 is repeatedly carried out.

In the step 1402, an acquisition of performance information of a volume to be processed is requested to an OS (Operating System), and then, the acquisition result is obtained. In this first embodiment, as one example, both a total IO time (IOPS) per 1 second and a total transfer byte number (transfer rate) per 1 second are acquired every volume.

In the step 1403, a SCSI inquiry is issued with respect to the volume to be processed, and then, both a WWN of a host-sided port (namely, WWN of HBA) and a WWN of a storage-sided port, which are used by this volume, are extracted from a response to this SCSI inquiry. In the case that the process operation is carried out with respect to the volume A-A in the structural example shown in FIG. 6, in this step 1403, both a WWN of a port H-A and a WWN of a port S-A are acquired.

FIG. 15 is a diagram for explaining response information of a SCSI inquiry with respect to the volume A-A. The SCSI inquiry can be issued from each of the hosts to each of volumes provided on the relevant host. The issued SCSI inquiry is transferred via the SAN to a storage apparatus, and then, the storage apparatus returns such a SCSI inquiry response information as shown in FIG. 15 to the server side. In the first embodiment, from a host performance information acquisition program 107 installed on each of the hosts A to D, a SCSI inquiry is issued with respect to a volume provided on the relevant host, and then, information as to a storage apparatus side of a connection destination is acquired by the returned SCSI inquiry response information. Also, in this first embodiment, SCSI inquiry response information holds such an information which contains both a WWN of a storage of a connection destination and a WWN of an HBA of a connection source host.

In a step 1404, both the information acquired in the step 1402 and the information acquired in the step 1403 are returned to the managing server 101.

Referring now to drawings, a storage system of a second embodiment to which the present invention has been applied will be described.

In this second embodiment, although an arrangement of the storage system is identical to that of the first embodiment, a process sequential operation of the conflicting host detection program 222 is different from that of the first embodiment.

Figure 16:
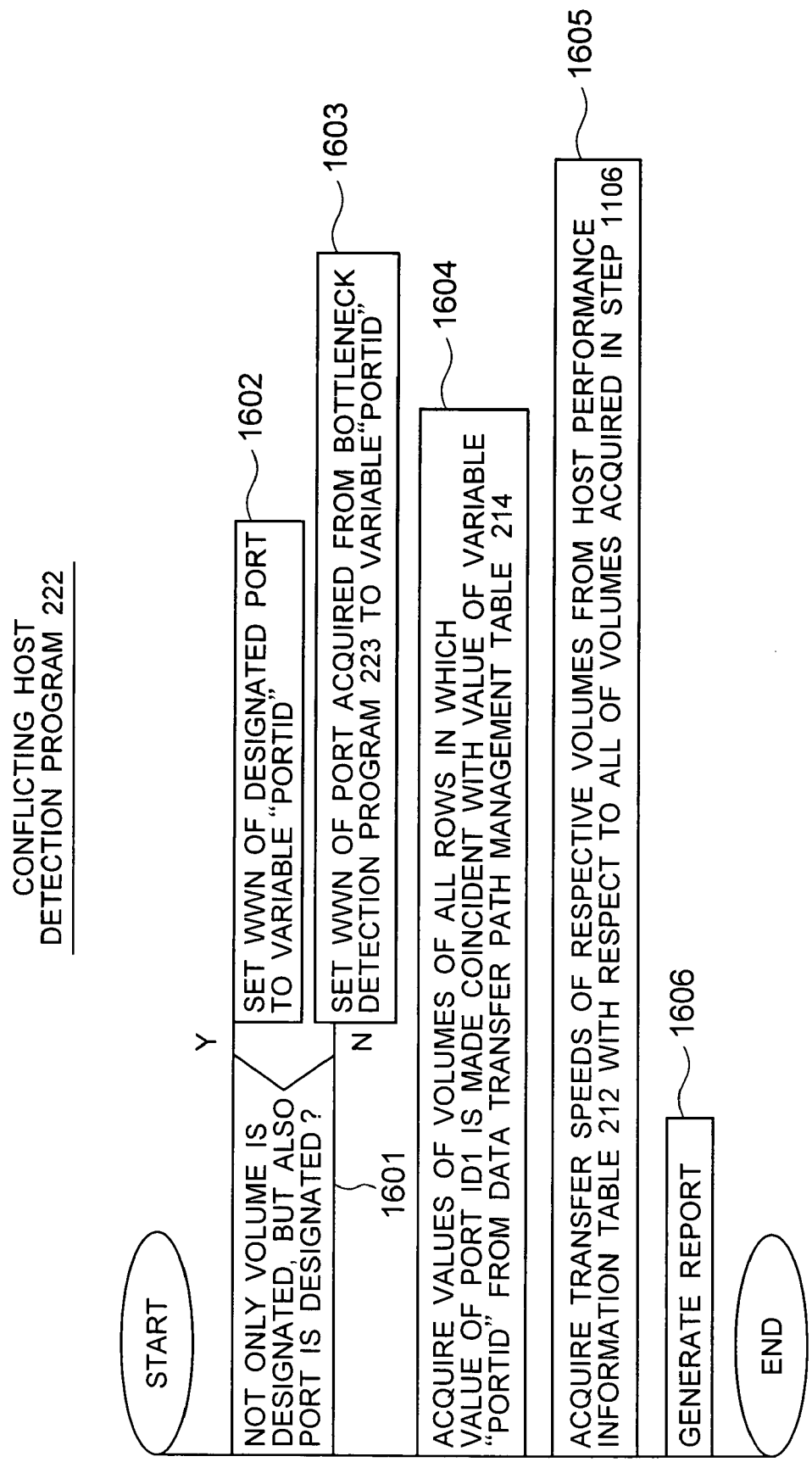
FIG. 16 is a PAD for showing a process sequential operation of a conflicting host detecting program 222 according to a second embodiment of the present invention.

FIG. 16 is a PAD for indicating process sequential operation of the conflicting host detection program 222 in this second embodiment.

The conflicting host detection program 222 commences an execution thereof in response to an initiation command for designating both a volume and a port, which is issued from the instruction input apparatus 202. The conflicting host detection program 222 executes the below-mentioned process operation which notifies the conflict condition of a port having a high load on a data transfer path to the designated volume.

In a step 1601, the conflicting host detection program 222 judges as to whether or not a request of a user contains a designation of a port. If this user request contains the designation of the port, then the process operation is advanced to a step 1602. To the contrary, if this user request does not contain the designation of the port, then the process operation is advanced to a step 1603.

In the step 1602, a WWN of the designated port is set to a variable "PortID."

In the step 1603, the bottleneck detection program 223 is executed so as to set the WWN of the acquired port to the variable "PortID."

In a step 1604, a value of a column of a volume as to such a row that a value of a port ID1 is made coincident with the value of the variable "PortID" is acquired from the data transfer path table 214.

In a step 1605, performance information of the respective volumes is acquired with respect to all of the volumes acquired in the step 1604 from the host performance table 212.

Figure 17:
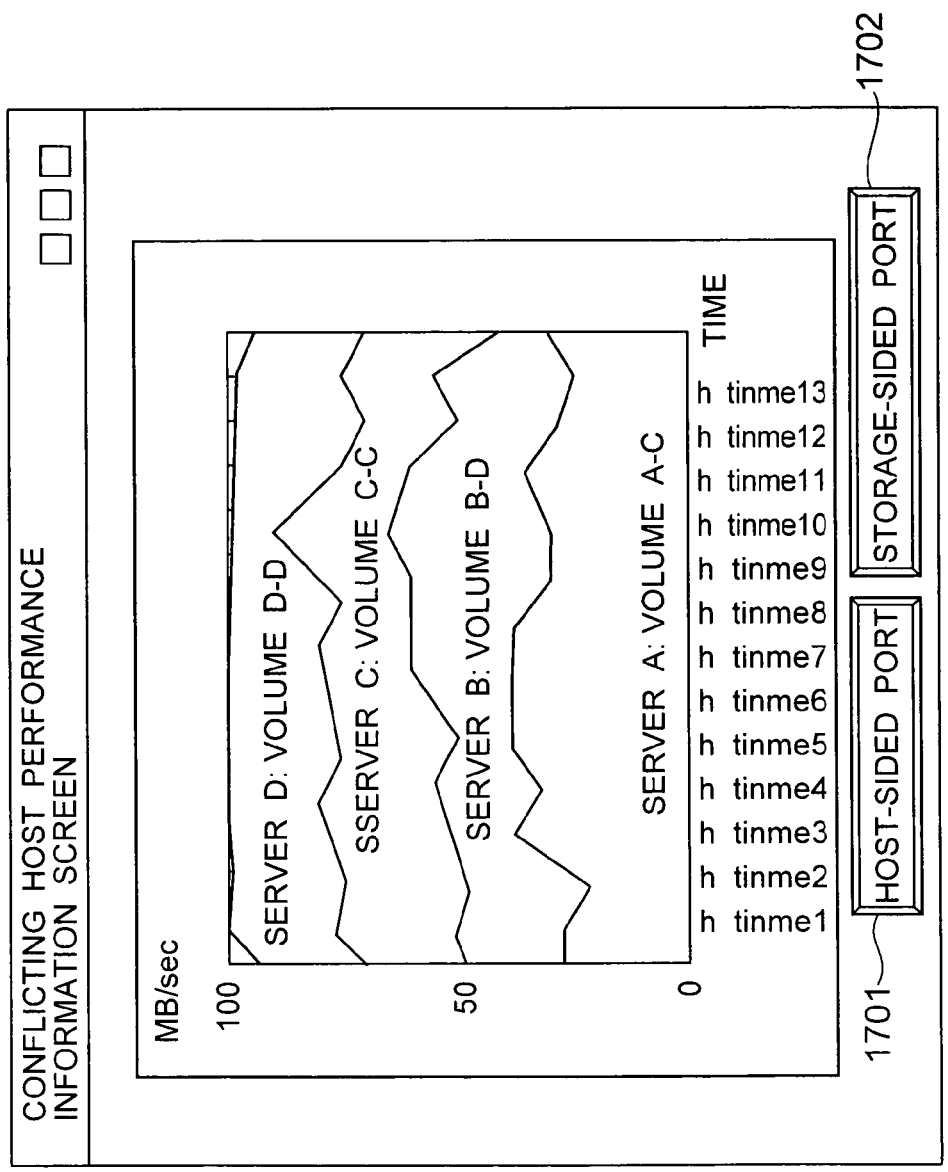
FIG. 17 is a diagram for indicating an example of a report which is generated by a conflicting host detecting program A 222 executed in the second embodiment of the present invention.
Figure 18:
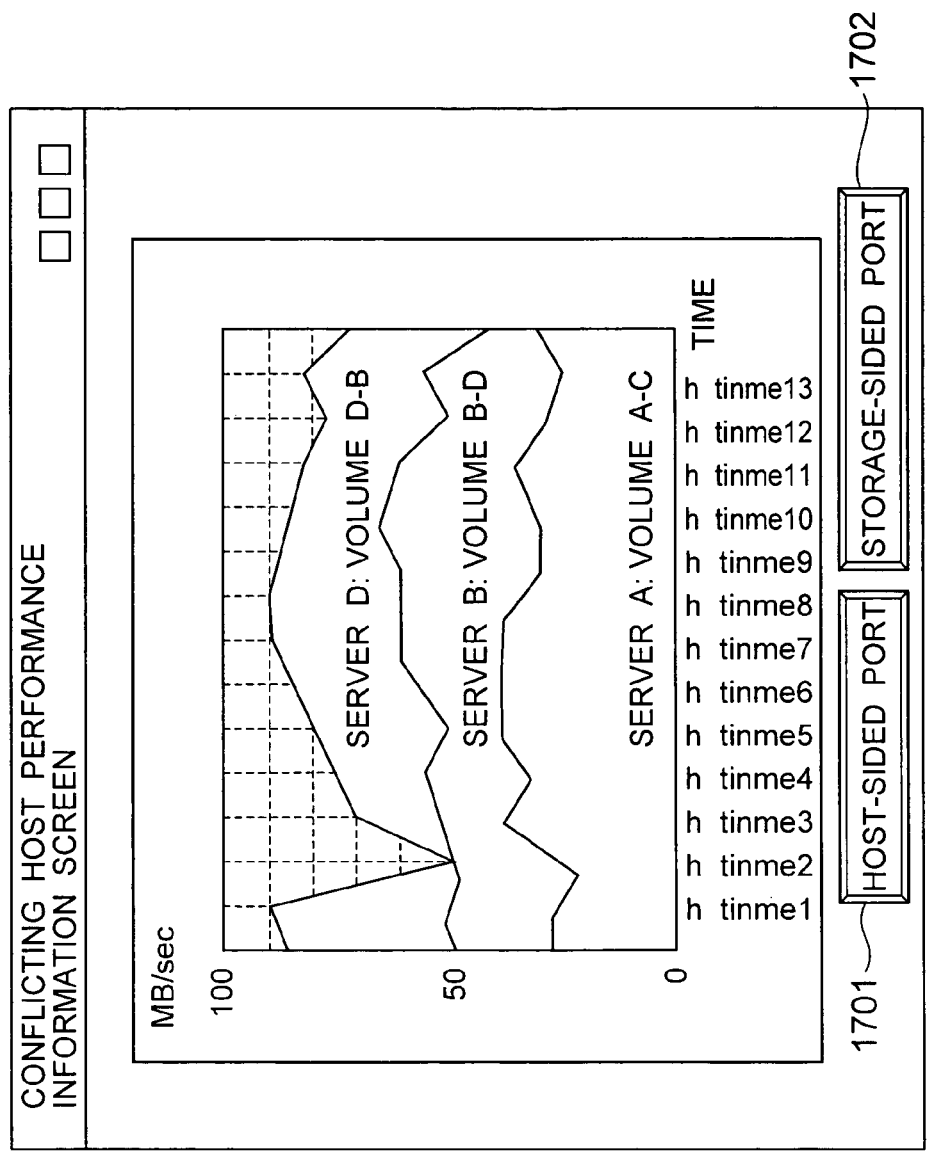
FIG. 18 is a diagram for showing an example of another report which is generated by the conflitting host detecting program A 222 executed in the second embodiment of the present invention.

In a step 1606, a report is generated based upon the performance information as to the respective volumes, which has been acquired in the step 1605. In the structural example shown in FIG. 6, an example of the report as to the port B, which has been generated in this step 1606, is represented in FIG. 17. The example shown in FIG. 17 corresponds to such a report that both a host-sided port display button 1701 and a storage-sided port display button 1702 are provided on the report example shown in FIG. 12. Since the user clicks the host-sided port display button 1701, both the volume designated by the user and the conflicting host detecting program 222 are called, while a WWN of a port is designated which is located on the side of one host of a port which is presently displayed on the data transfer path. As a result, the user can refer to the conflict condition of the port (namely, port B3) which is located on the side of one host of the port which is presently displayed on the data transfer path (FIG. 18).

When the conflicting host detection program 222 generated a report (step 1606), such a process operation may be made in relation to a button of "host-side port", while this process operation implies "conflicting host detection program 222 is called by designating both name of volume to be processed and WWN of host-sided port." If such a process operation may be made in relation to a button of "storage-sided port", while this process operation implies "conflicting host detection program 222 is called by designating both name of volume to be processed and WWN of storage-sided port", then the process operations explained in this second embodiment can be executed in such a case that the host-sided port display button 1701 is clicked, or the storage-sided port display button 1702 is clicked.

In accordance with the SAN managing system shown in this second embodiment, the port of the bottleneck of the host connected to the SAN on the data transfer path within this SAN, and the performance index values of the host group which gives the load to the relevant port are displayed at once. As a consequence, in such an arrangement that a plurality of hosts are connected to the same SAN, such a condition that the I/O loads are concentrated to the specific port employed within the SAN can be easily detected, and also, the hosts which give the I/O loads can be readily specified.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An SAN managing method which acquires and analyzes performance information in a system where a plurality of hosts are connected to an SAN (storage area network), comprising:
   a host volume performance information acquisition step which acquires performance information with respect to respective volumes on the respective hosts;
   a data transfer path information acquisition step which acquires identifiers of ports on data transfer paths as to the respective volumes of the respective hosts;
   a bottleneck port detection step which detects a specific port based on a load on the port; and
   an extracted host volume performance information output step which extracts only a host volume which uses the specific port on the data transfer paths, which has been acquired in the data transfer path information acquisition step, and which outputs performance information of the extracted host volume.

2. An SAN managing method as claimed in claim 1, wherein, in the extracted host volume performance information output step, only a host volume is extracted which uses a specific path on the data transfer paths, which has been acquired in the data transfer path information acquisition step, and then, performance information of the extracted host volume is outputted.

3. An SAN managing method as claimed in claim 1, wherein the specific port is a port whose load is the highest load within ports of a data transfer path of a specified host volume based upon the data transfer path information acquired in the data transfer path information acquisition step.

4. An SAN managing method as claimed in claim 3 wherein:
   only such a host volume which uses the port detected in the bottleneck port detecting step is extracted, and performance information of the extracted host volume is outputted.

5. An SAN managing method as claimed in claim 1, wherein the extracted host volume performance information output step changes a display subject along the data transfer path based upon the data transfer path information acquired by the data transfer path information acquisition step.

6. An SAN managing method as claimed in claim 1, wherein, in the extracted host volume performance information acquisition step, performance information is historically acquired, and further, the performance information of the extracted host is historically outputted in the extracted host volume performance output step.

7. An SAN managing system which acquires and analyzes performance information in a system where a plurality of hosts are connected to an SAN (storage area network), comprising:
   host volume performance information acquisition means which acquires performance information with respect to respective volumes on the respective hosts;
   data transfer path information acquisition means which acquires identifiers of ports on data transfer paths as to the respective volumes of the respective hosts;
   a bottleneck port detection step which detects a specific port based on a load on the port; and
   extracted host volume performance information output means which extracts only a host volume which uses the specific port on the data transfer paths, which has been acquired by the data transfer path information acquisition means, and which outputs performance information of the extracted host volume.

8. An SAN managing system which acquires and analyzes performance information in a system where a plurality of hosts are connected to an SAN (storage area network), comprising:
   host volume performance information acquisition means which acquires performance information with respect to respective volumes on the respective hosts;
   data transfer path information acquisition means which acquires identifiers of ports on data transfer paths as to the respective volumes of the respective hosts;
   a bottleneck port detection step which detects a specific port based on a load on the port; and
   extracted host volume performance information output means which extracts only a host volume as a conflicting host which uses the specific port on the data transfer paths, which has been acquired by the data transfer path information acquisition means, and which outputs all of performance information of the extracted host volume.

9. An SAN managing system which acquires and analyzes performance information in a system where a plurality of hosts are connected to an SAN (storage area network), comprising:
   host volume performance information acquisition means which acquires performance information with respect to respective volumes on the respective hosts;
   data transfer path information acquisition means which acquires identifiers of ports on data transfer paths as to the respective volumes of the respective hosts;
   bottleneck port detection means which detects such a port whose load is the highest load within ports of a data transfer path of a specific host volume in order to detect a specific port on the data transfer paths, which has been acquired by the data transfer path information acquisition means; and
   extracted host volume performance information output means which extracts only a host volume which uses the specific port detected by the bottleneck port detection means, and for outputting all of performance information of the extracted host volume.

10. An SAN managing system containing ports and switches between hosts and storages, comprising:
    host volume performance information acquisition means which acquires performance information of the ports with respect to respective volumes on the respective hosts;
    data transfer path information acquisition means which acquires identifiers of ports on data transfer paths as to the respective volumes of the respective hosts;
    bottleneck port detection means which detects such a port whose load is the highest load within ports of a data transfer path of a specific host volume in order to detect a specific port on the data transfer paths, which has been acquired by the data transfer path information acquisition means; and
    extracted host volume performance information output means which extracts only a host volume which uses the specific port detected by the bottleneck port detection means, and for outputting all of performance information of the extracted host volume.

11. An SAN managing system containing ports and switches between hosts and storages comprises:
    a management server connected to the hosts and the switches via Local Area Network, wherein the management server comprises a memory; and
wherein the memory comprises the functions of:
a host volume performance information acquisition unit which acquires performance information of the ports with respect to respective volumes on the respective hosts;
a data transfer path information acquisition unit which acquires identifiers of ports on data transfer paths as to the respective volumes of the respective hosts;
a bottleneck port detection unit which detects such a port whose load is the highest load within ports of a data transfer path of a specific host volume in order to detect a specific port on the data transfer paths, which has been acquired by the data transfer path information acquisition unit; and
an extracted host volume performance information output unit which extracts only a host volume which uses the specific port detected by the bottleneck port detection unit, and for outputting all of performance information of the extracted host volume.

* * * * *